United States Patent [19]

Reip

[11] 4,390,041
[45] Jun. 28, 1983

[54] PILOT OPERATED RELIEF VALVE

[75] Inventor: Raymond G. Reip, Clarendon Hills, Ill.

[73] Assignee: Vapor Corporation, Chicago, Ill.

[21] Appl. No.: 233,860

[22] Filed: Feb. 17, 1981

Related U.S. Application Data

[63] Continuation of Ser. No. 943,377, Sep. 18, 1978, abandoned.

[51] Int. Cl.³ ............................................. F16K 31/12
[52] U.S. Cl. .................................... 137/488; 137/492; 137/102
[58] Field of Search ...................... 137/488, 492, 492.5, 137/102; 251/29

[56] References Cited

U.S. PATENT DOCUMENTS

| | | | |
|---|---|---|---|
| 3,110,468 | 11/1963 | Herion | 251/29 |
| 3,272,218 | 9/1966 | Johnson | 137/102 |
| 3,294,111 | 12/1966 | Abercrombie | 137/492 |
| 3,414,008 | 12/1968 | Greenwood | 137/492 |
| 3,512,549 | 5/1970 | Wiegand | 137/492.5 X |
| 3,664,362 | 5/1972 | Weise | 137/488 X |
| 3,754,566 | 8/1973 | Gemigniani | 137/488 X |

Primary Examiner—Alan Cohan
Attorney, Agent, or Firm—Francis J. Lidd

[57] ABSTRACT

A pilot operated relief valve for use on medium and high pressure vessels, conduits, and the like. A unique two-stage, non-flowing pilot valve operates a main relief valve of substantially greater capacity. In a preferred embodiment main valve is mounted directly onto the pressure vessel which is to be vented at a predetermined pressure. The pilot is preferably mounted closely adjacent to the main valve for operating communication therewith. A particularly unique ball selector provides means for testing both first and second stages without operating the main valve, providing improved setpoint and reset or blowdown adjustments for the overall combination.

4 Claims, 7 Drawing Figures

PILOT OPERATED RELIEF VALVE

This application is a continuation of application Ser. No. 943,377, filed 9/18/78, now abandoned.

BACKGROUND OF THE INVENTION

This invention relates generally to pressure operated relief valves and more particularly concerned a novel two-stage pilot valve, providing pressure operation of a relief valve having substantially larger capacity. In particular, the valve disclosed provides improved main valve operation through control of pressure dynamics of the combination pilot, main valve, and associated pressure conduit or vessel. An improved method of calibrating and testing pressure sensitive elements is also provided.

Prior art relief and/or valve combinations are disclosed in U.S. Pat. Nos. 3,595,263, 3,664,362, 3,512,560 and 3,568,706. However, the operation provided by these combinations of main and pilot valves do not adequately provide for control of the dynamic relationships between the pilot valve, main valve, and pressure vessel or conduit. In addition, the prior art valves in many cases, when tested on site, provide a method of testing only a pilot valve set point. The reset or blowdown pressure setting of the pilot valve first stage operation remain untested. Testing and/or calibration checking by operation of the entire unit through increased pressure of the associated vessel or tank, necessitates release of the stored tank or vessel product which in many cases is highly undesirable. The unit disclosed here provides for onsight testing of both major elements of the relief system, and main valve, or alternately the pilot valve first stage alone. Therefore, it is an object of the invention to provide a two-stage pilot valve for operation of a larger capacity pressure relief valve wherein test operation of the first stage pilot is possible without raising main valve pressure.

It is an object of the invention to provide a pressure relief valve of substantial capacity having improved control of the flow and pressure dynamics associated with the relief valve and pressure vessels or conduits requiring pressure relief.

It is a further object of the invention to provide a unique two-stage pressure sensitive pilot valve, wherein flow of the pressurized product through the valve occurs only during the transient, or transitional stage.

It is a still further object of the invention to provide a two-stage pressure operated pilot valve for operating main relief valves of substantially larger capacity wherein the pilot flow can be highly filtered providing increased reliability to freedom from contamination.

It is an additional object of this invention to provide a pilot operated relief valve for operation at medium to high pressures wherein the dynamic relationship between the calibrated first stage and flow amplifying second stage has a substantial range of adjustment, providing adequate transient free operation of the associated main valve over a wider range of piping and pressure vessel configurations.

SUMMARY OF THE INVENTION

The pressure operated relief valve disclosed here employs mechanically independent first and second pressure operated stages. In a preferred embodiment, the two-stage pilot valve operates a substantially larger main valve by venting the main valve head volume. The design of the main valve is such that prior to the relief valve venting, the main valve closure member is in pressure equilibrium with the tank or pressure vessel. However, when the head volume is vented to atmosphere the tank pressure is utilized to open the main valve providing the desired pressure relief. An additional pressure signal to the pilot valve is provided by a down stream venturi or ram tube which provides an indication of true tank pressure allowing the pilot and main valve to reset at a correct tank pressure independent of the magnitude of main valve flow.

A feature of the two-stage pilot valve disclosed utilizes a specific storage volume to control the rate of change of actuating product flow, to be vented by the main valve, between the first and second stages. These controlled rates of operation provide positive and more accurate relief and blowdown operations of both the pilot and main valve.

An additional advantage provided by the invention disclosed involves the use of a unique ball selector which allows testing of the pilot valve stages from an independent and/or calibrated pressure source automatically admits test pressures higher than the storage tank pressure, thereby confining test pressure to the pilot valve alone. On subsequent reduction of the test pressure pilot action is such that the test connection is automatically closed off allowing testing equipment to be disconnected without loss of tank or product pressure.

BRIEF DESCRIPTION OF THE DRAWINGS

Other objects and advantages of the inventions will become apparent when reading the following detailed description and upon reference to the drawings, in which.

While the invention will be described in connection with a preferred placement of pilot and main relief valve, it should be understood that it is not intended to limit the invention to the configuration disclosed. On the contrary, it is intended to cover all alternatives, modifications, and equivalences may be included within the spirit and scope of the invention and is defined by the appended claims.

DETAILED DESCRIPTION OF THE INVENTION

Figure 1:
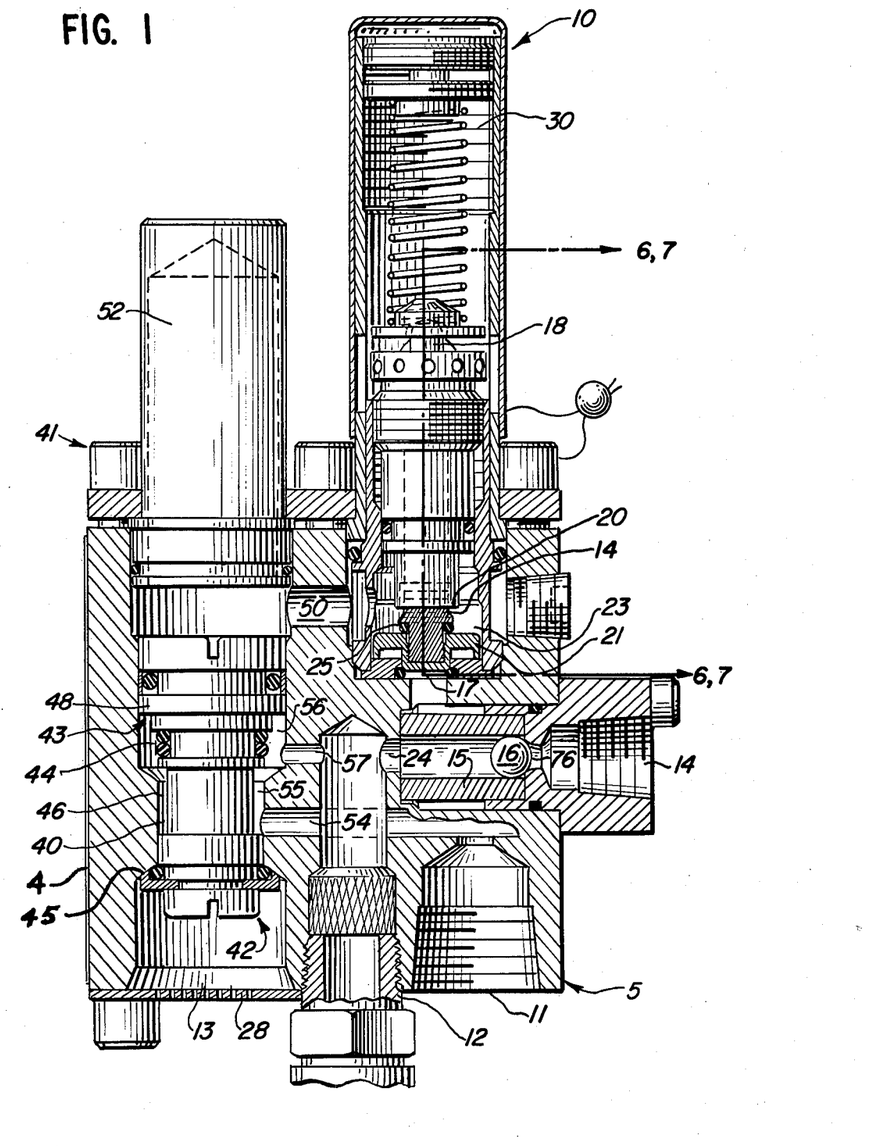
FIG. 1 is a sectional view of the pilot valve showing the first and second stages ball selector, and associated porting.
Figure 2:
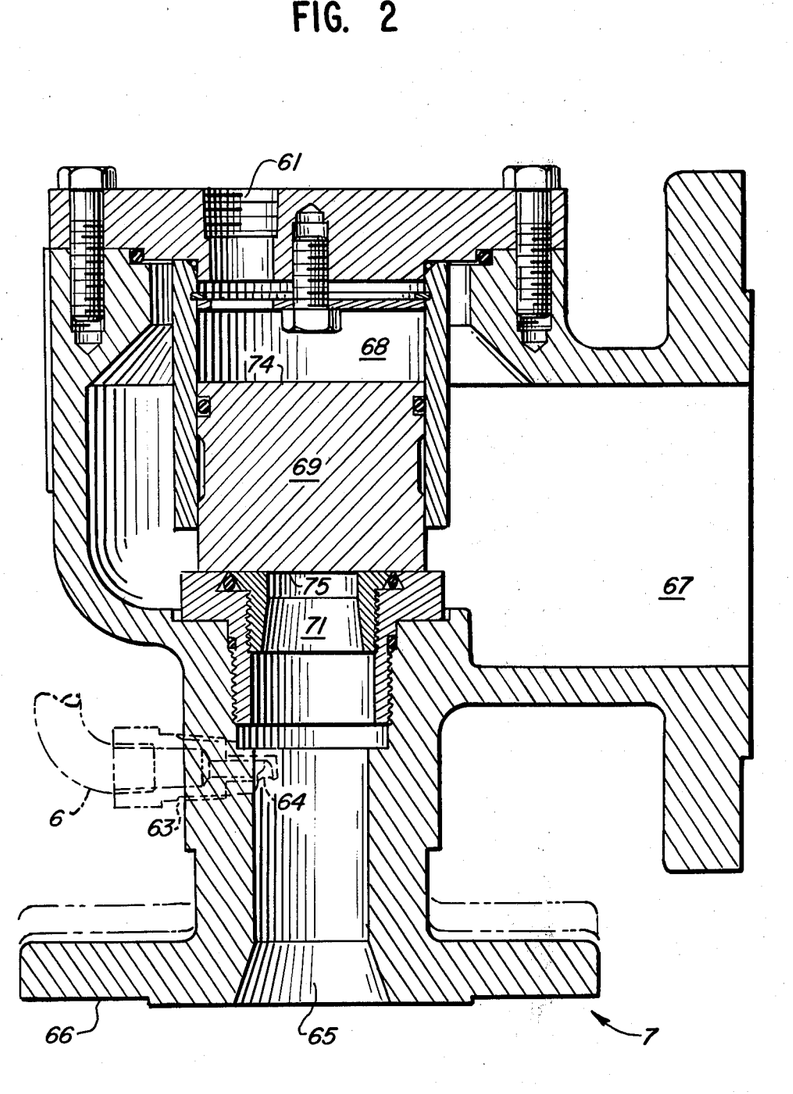
FIG. 2 is a sectional view of the main valve portion of the invention including tank, conduit, or pressure vessel inlets, and showing the pilot tube, port, and pilot valve connecting tube.
Figure 3:
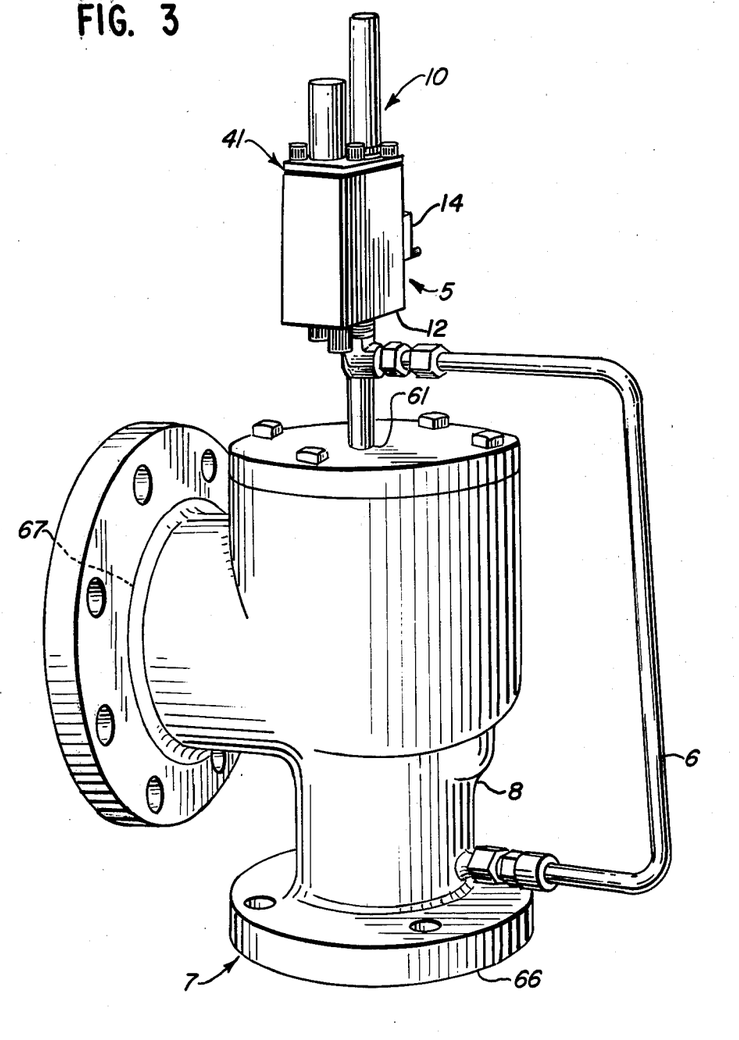
FIG. 3 is a semi-pictorial view of the entire pilot operated relief valve in a preferred but not exclusive embodiment, wherein the two-stage pilot valve is mounted closely adjacent to the main valve. Also shown is the pilot tap, connecting tube and its associated pressure tap just above the main valve inlet port.
Figure 4:
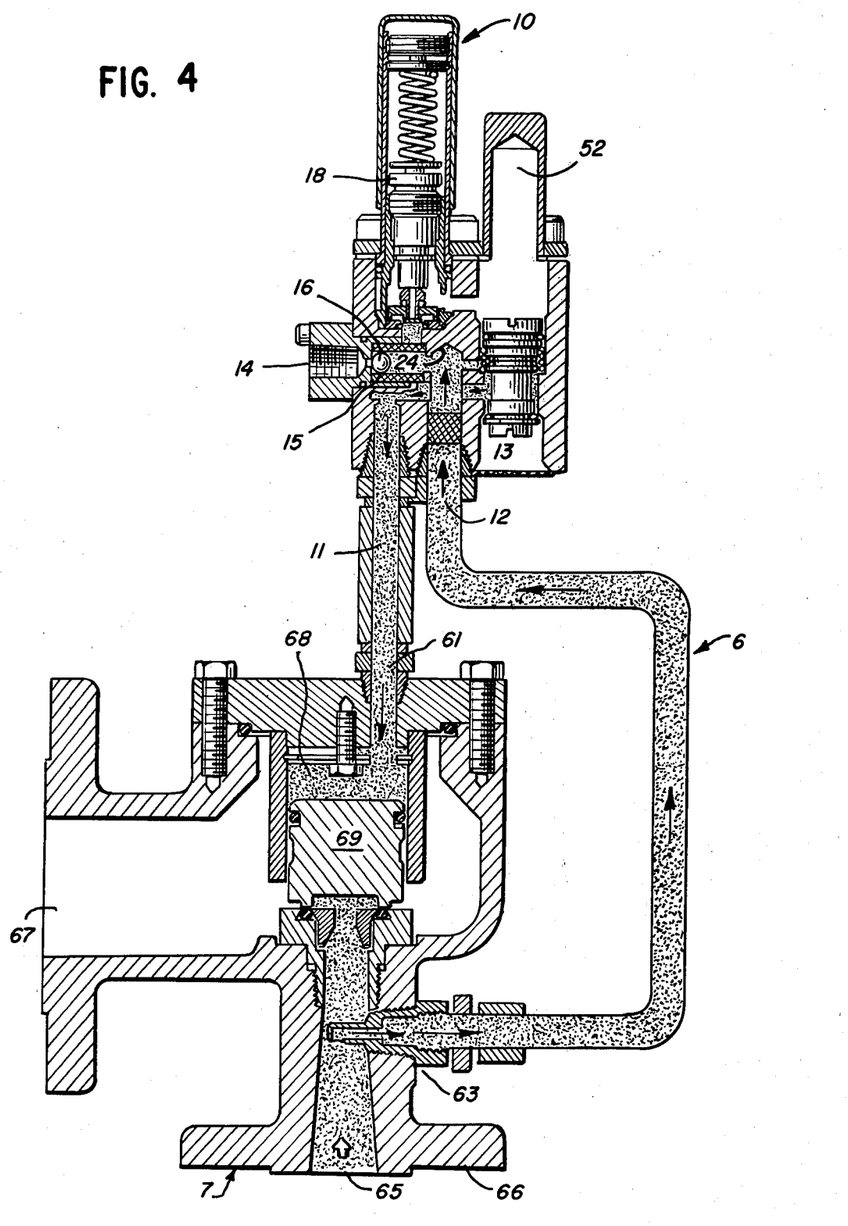
FIG. 4 is a semi-pictorial flow diagram showing interconnection of the pilot and main valves, shown in the normal, new venting stage.

In reference to FIGS. 1 and 2, the pressure operated relief valve disclosed here consists of a pilot valve generally shown as 5 (ref. FIG. 1), having a first stage 10 and a secoqd stage generally shown as 41 contained in a body 4. In a preferred embodiment the pilot is mounted closely adjacent to the upper end of a main valve 7 communicating with the pilot through main valve port 61 and port 11 of the pilot valve. In the disclosed embodiment a pipe or conduit connects 61 and 11 (ref. FIG. 3). Additionally, there is an inner-connecting external pressure tube 6 further communicating with a pressure tap 63 contained in the lower portion of the main valve 7 just above the main valve inlet flange 66 and inlet port 65. The pressure tap 63 communicates with a total pressure pitot ram tube 64, providing a tank pressure signal during main valve flow. Typically, the lower flange 66 of the main valve is mounted on an opening or communicates with a pressure vessel, or conduit. Operation of the pressure operated relief valve therefore vents the product contained in the above mentioned pressure vessel or conduit.

In operation, assuming that tank pressure is below the relief setting or value, as shown in FIGS. 1 and 2, static pressure from the associated vessel or conduit is applied to the main valve piston through the port 65 and the pilot valve through port 12 and tube 6, as discussed above. Pressure is therefore communicated internal to the pilot valve to the first and second stage elements via ports 57 and 24. Therefore, the first stage poppet 18 experiences pressure over the area defined by the first stage inlet seat, or port 17.

The design of the second stage poppet assembly 43 and differential areas associated with the second stage closure member or plunger 48 maintain the second stage poppet assembly 43 as shown in its non-venting position sealing against seat 45. Under these conditions, since tank pressure acts on upper and lower surfaces of the main valve piston 69 through port 11, 12, and 61, 63 respectively, and the main valve effective area 74 is greater than the main valve effective area 75, the main valve closure member also remains in the seated or closed position and no venting of the tank occurs.

Tank pressure is sensed through the main valve inlet 65, and the pressure setting of the pilot valve first stage is determined by the force pre-load of compression spring 30 contained in the pilot valve first stage. When tank pressure increases beyond the calibrated setting, force exerted on the first stage through first stage inlet port or seat 17, raises the poppet 18, thereby opening the first stage inlet 17 and allowing product flow through the first and second stage interconnecting port 50. The design of the second stage poppet assembly 43 is such that the second stage poppet or closure member 48 is forced to a position where the second stage seals 44 move vertically in the bore 40 until they seat against the bore seal region at 46.

Figure 5:
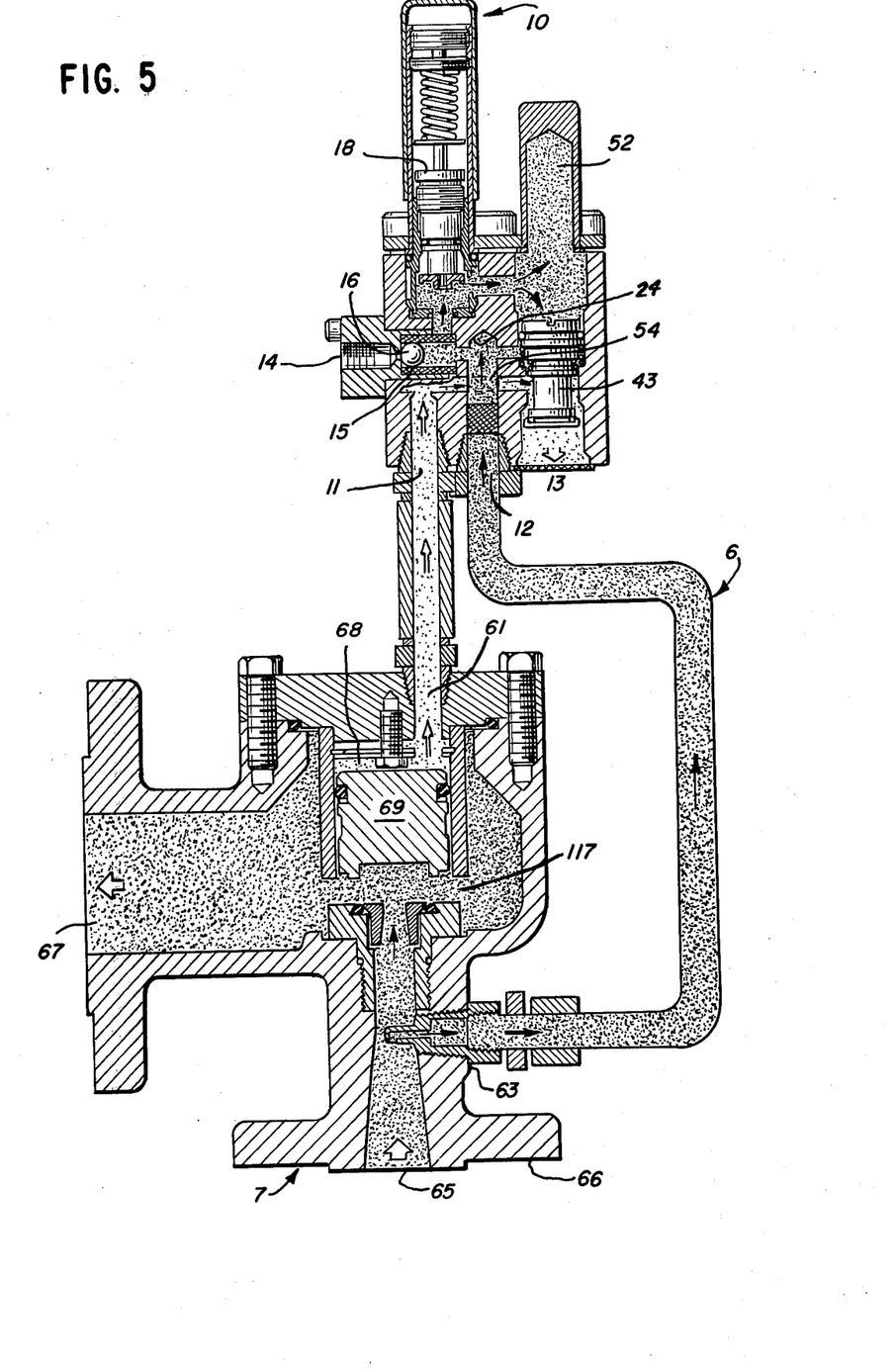
FIG. 5 is a semi-pictorial flow diagram showing interconnection of pilot and main valves, shown in the venting or relief state.

At this time, the main valve head volume 68 vents to the atmosphere through passages 54, 11, 55 and screened vent 13. Also, cavity 56 is closed off by the sealing action of the seals 44, thereby eliminating communication between the tank and main valve head volume 68 through passage 57. Since at this time the pressure above the main valve closure member 69 and area 74 is substantially less than that exerted on the lower area 75, the closure member or shut-off piston 69 rises allowing the tank product to vent via flow passages 65, 71 and vent to the atmosphere through orifice 67 (ref. FIG. 5).

Figure 6:
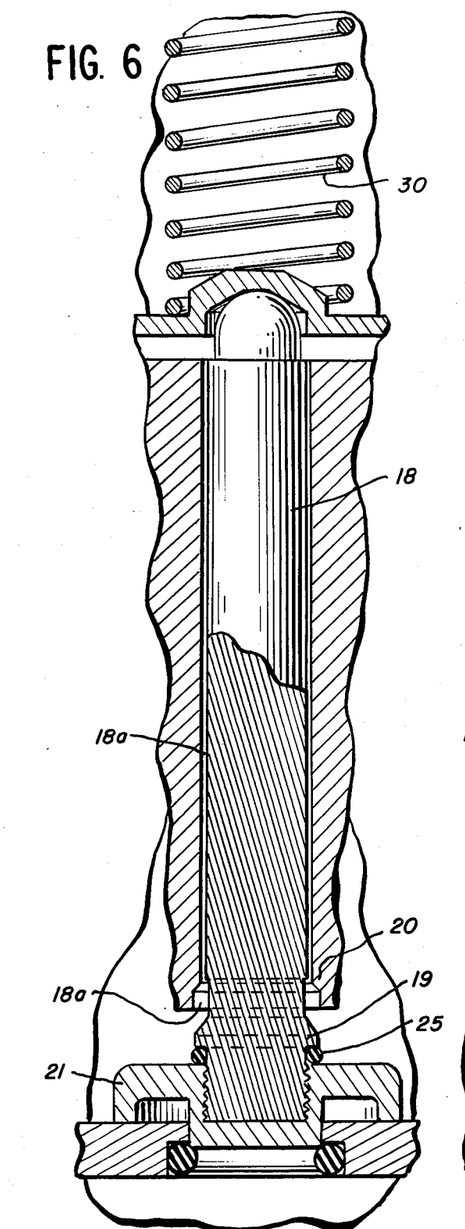
FIG. 6 is a partial section of the first stage pilot valve showing the poppet assembly, in a closed or non-venting position.
Figure 7:
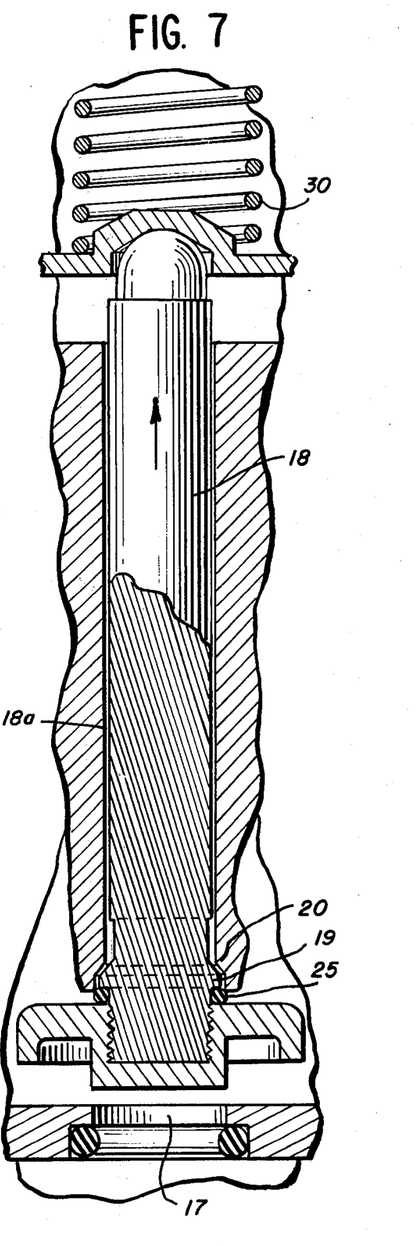
FIG. 7 is a partial section of the first stage pilot valve showing the poppet assembly, in an open or flowing position.

With particular reference to FIGS. 6 and 7 it should be noted that the first stage poppet assembly 18 utilizes a reaction lip 21 and blowdown pressure sensing elements 19 on the first stage poppet assembly 18. The purpose of the reaction lip is to conserve momentum of the product venting through port 17 by redirecting it against the base of the first stage poppet seat. This construction provides a regenerative action wherein the exposed poppet area increases as the poppet lifts off, providing the first stage poppet with a more consistent lift or movement.

After operation of the first and second poppets, total pressure of the vented tank or conduit is now supplied to the ram or pilot tube 64, located in the relief inlet at 63, and communicates this pressure through the tube 6 and port 12, thereby maintaining the second stage poppet assembly 42 in its depressed or relief position.

It should be noted that during the period of main valve head venting, the second stage closure member 48 "shuts-off" after a very small amount of transient product flow. Therefore the only flow of product through the first pressure sensing state 10 is the amount required to operate the second stage 41, and to pressurize the volume above the second stage, including the volume 52 and other volumes inherently associated with the construction of the first and second stage combination. The small volume flow allows the use of a very fine filter 15 thereby greatly reducing the amount of contaminated particles or materials entering the pilot valve. This low flow characteristic is therefore a substantial advantage and provides increased overall valve reliability and adherence to preset pressure settings.

When the product flow through the main valve 7 causes a reduction in pressure sensed by the ram tube 64 to a point where the set point spring 30 exerts sufficient force to begin downward movement of the first stage poppet 18 (ref. FIG. 6), the seal 25 associated with the first stage poppet moves away from the first stage poppet blowdown seat 20 allowing a controlled amount of leakage from the first stage poppet chamber 23 through a clearance passage 18a between the poppet 18 and seat 20. This action essentially "slows down" the downward descent of the first stage poppet, since the leakage in effect reduces the transient pressure differential occurring across the poppet and the orifice 17. It should be noted that without this essential feature, rapid motion of the poppet would result in transient closing of the orifice 17, and consequential transient reclosing of the second stage poppet, resulting in further and destructive transient operation or "chattering" of the main valve member 69.

The controlled descent of the first stage poppet is enhanced by the presence of a damping chamber 52 which supplies the working product or fluid to insure that the poppet leakage is consistent and predictable nature.

It should be noted that the above predictable and controlled first stage poppet also occurs on lift-off, when the damping chamber 52 and clearance 18a which essentially bleeds off product flow through the orifice 17 by filling the chamber 52, again coact to preventing chatter or mechanical vibration or uncontrolled motion of the poppet 18 due to pressure and flow 8a transients with ensuing operation of the second stage and main valve.

Therefore, the pilot valve disclosed herein provides controlled operation during the transient phase through control of transient pressures in the first and second poppet associated volumes. These pressures are significant in providing stable poppet operation. If the pressures decay too rapidly on blowdown or rise too rapidly on lift-off, valve operation will exhibit unwanted and damaging oscillation or chatter. However, as disclosed, the proper combination of differential popper areas, and associated volumes, the pressure reduction at a reduced rate is achieved resulting in positive and controlled downward movement of the first stage poppet and associated resetting of the second stage.

An additional feature of the pilot valve disclosed is incorporation of a ball selector 16 located between the inlet port 12, the cross port 24, and the field test port 14. The ball selector is entirely surrounded by a first stage filter or guide 15, resulting in, as indicated above, greatly reduced contamination of the entire pilot assembly.

Field testing is accomplished by supplying air, or other convenient medium, at a known pressure, to test point 14. Action of the ball 16 in the inlet orifice 76 closes the pilot test connection until the applied test pressure reaches a value higher than the tank pressure provided through port 12 and tube 6. This is done by the ball 16 moving to close port 24, thereby isolating the product contained in the tank. On reduction of the test pressure to a value lower than tank pressure, ball 16 moves to again close port 76, thereby preventing inadvertent escape of product volume on removal of the test device from port 14.

Use of this "selector ball" confines test pressure to the first stage thereby requiring a small volume of test gas, i.e., only the amount requiring a small volume of test gas, i.e., only the amount required to fill volume 52 and other volumes inherently associated with the construction of first and second stages 10 and 41.

Thus it is apparent that there has been provided in accordance with the invention a pilot operated relief valve utilizing a two-stage non-flow pilot which fully satisfies the objects, aims, and advantages set forth above. While the invention has been described in connection with a specific configuration and component embodiments, it is evident that many alternatives, modifications, and variations will be apparent to those skilled in the art in light of the foregoing description. Accordingly, it is intended to embrace all such alternatives, modifications, and variations as fall within the spirit and broad scope of the following claims.

I claim:

1. A pressure sensitive pilot valve for operating a main pressure relief valve to relieve excess product vapor pressure, having first and second stages in cascade, comprising;
   a valve body containing said stages and having first and second inlet ports for sensing product and main valve head pressure, respectively, exhaust and test ports;
   a first seat in said body in fluid communication with said first inlet port;
   a first stage poppet having first and second positions seated on and restricting flow through said first seat for said first poppet position, below a predetermined value of product pressure and allowing flow therethrough for said second poppet position;
   second and third seats in said body;
   a second stage plunger, having upper and lower ends, reciprocating in said housing, said upper end responsive to first stage flow and movable between said second and third seats for first and second poppet positions respectively;
   means fluid communicating said first seat and plunger upper end for said second poppet position;
   means communicating said first inlet port and second seat for a first plunger position;
   means communicating said second inlet port, exhaust port, and third seat for a second plunger position;
   guide means intermediate said first inlet and test port;
   a flow sensitive closure member contained in said guide means for reciprocal movement therein, said member sealing said test port or communicating means at either end of said motion;
   wherein fluid admitted to said test port and reaching a pressure greater than said product pressure isolates said first seat.

2. The pilot valve of claim 1 where said guide means include a fluid permeable cylinder and said flow sensitive member is a ball.

3. The pilot valve of claim 2 further comprising;
   a predetermined volume communicating with said plunger upper end, providing control of internal pilot product flow during said poppet and plunger movements.

4. In a two stage pilot valve having a valve body, a first stage poppet, and a second stage plunger, and utilizing reciprocal poppet motion attendant periods of valve relief and reseating operation, for relieving product vapor pressure in excess of a predetermined relief value, having a pressure operated first stage admitting product flow therethrough when product pressure exceeds said predetermined relief value, and a second stage responsive to first stage product flow, for operating a main valve and terminating product flow through said first stage, the improvement comprising;
   a first stage poppet comprising;
   a stem having a piston at one end;
   means mounting said stem in said body for reciprocal motion therein
   a shoulder, on said stem coaxial with and adjacent said piston;
   a seal intermediate said piston and shoulder;
   a seat defined by said mounting means adjacent said shoulder and coaxial said stem, coacting with said shoulder and seal to terminate poppet motion and flow through said passage during relief operation;
   a passage, defined by said stem and mounting means clearance, providing product flow therethrough during periods of poppet operation;
   a damping chamber in fluid communication with said first and second stages during periods of poppet relief operation, providing controller poppet motion;
   a cavity in said body for containing said first poppet;
   a seat defined by said cavity coacting with said piston to prevent product flow for vapor pressures less than said relief valve; and
   a test port in said body;
   means in said body, fluid communicating said test port, seat, and cavity;
   a product inlet in said body in fluid communication with said communicating means
   guide means intermediate said test port and communicating means, said guide means in further fluid communication with said test port and seat;

a flow sensitive closure member contained in said guide means for reciprocal motion therein said member sealing said test port or communicating means at either end of said motion;

wherein introduction of test vapor at a pressure greater than normal product pressure moves said closure member to isolate said product inlet, providing operation of the pilot without an increase in product pressure.

* * * * *